(12) United States Patent
Yue et al.

(10) Patent No.: US 7,490,208 B1
(45) Date of Patent: Feb. 10, 2009

(54) ARCHITECTURE FOR COMPACT MULTI-PORTED REGISTER FILE

(75) Inventors: Lordson Yue, Foster City, CA (US);
John W. Berendsen, Quebec (CA);
Karim M. Abdalla, Menlo Park, CA (US); Rui M. Bastos, Porto Alegre (BR);
Radoslav Danilak, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 380 days.

(21) Appl. No.: 10/959,560

(22) Filed: Oct. 5, 2004

(51) Int. Cl.
*G06F 13/372* (2006.01)
*G06F 12/00* (2006.01)

(52) U.S. Cl. .................. 711/167; 711/149; 345/534; 345/559

(58) Field of Classification Search ................ None
See application file for complete search history.

(56) References Cited

U.S. PATENT DOCUMENTS

| | | | |
|---|---|---|---|
| 5,414,567 A * | 5/1995 | Amada et al. | 386/29 |
| 7,006,404 B1 * | 2/2006 | Manapat et al. | 365/233 |
| 7,106,655 B2 * | 9/2006 | Lee | 365/233 |
| 7,187,617 B2 * | 3/2007 | Lin et al. | 365/230.06 |
| 2005/0180254 A1 * | 8/2005 | Tobescu et al. | 365/233 |

* cited by examiner

Primary Examiner—Gary J Portka

(57) ABSTRACT

Architecture for compact multi-ported register file is disclosed. In an embodiment, a register file comprises a single-port random access memory (RAM). The single-port RAM comprises a single port for read operations and for write operations. Either a single read or a single write operation is performed for a given clock via the single port. Moreover, the single-port RAM serially performs N read operations and M write operations associated with a data group using a clock phase of (N+M) clock phases generated from a clock. In another embodiment, a semiconductor device includes the architecture for compact multi-ported register file. The semiconductor device comprises a plurality of register files. Each register file comprises a RAM comprising a port for read operations and for write operations. Moreover, each RAM serially performs N read operations and M write operations associated with one of a plurality of data groups using a corresponding clock phase of (N+M) clock phases generated from a clock. Further, the semiconductor device comprises an input staging unit for staging write data of one or more of the write operations. Continuing, the semiconductor device comprises an output staging unit for staging read data of one or more of the read operations. The semiconductor device can be a graphics processing unit (GPU).

23 Claims, 17 Drawing Sheets

N= #reads
M= #writes
Z= #register files

Z= (N + M) for max. efficiency

N= #reads
M= #writes
Z= #register files

Z= (N + M) for max. efficiency

1st CLOCK CYCLE

2nd CLOCK CYCLE

3rd CLOCK CYCLE

4th CLOCK CYCLE

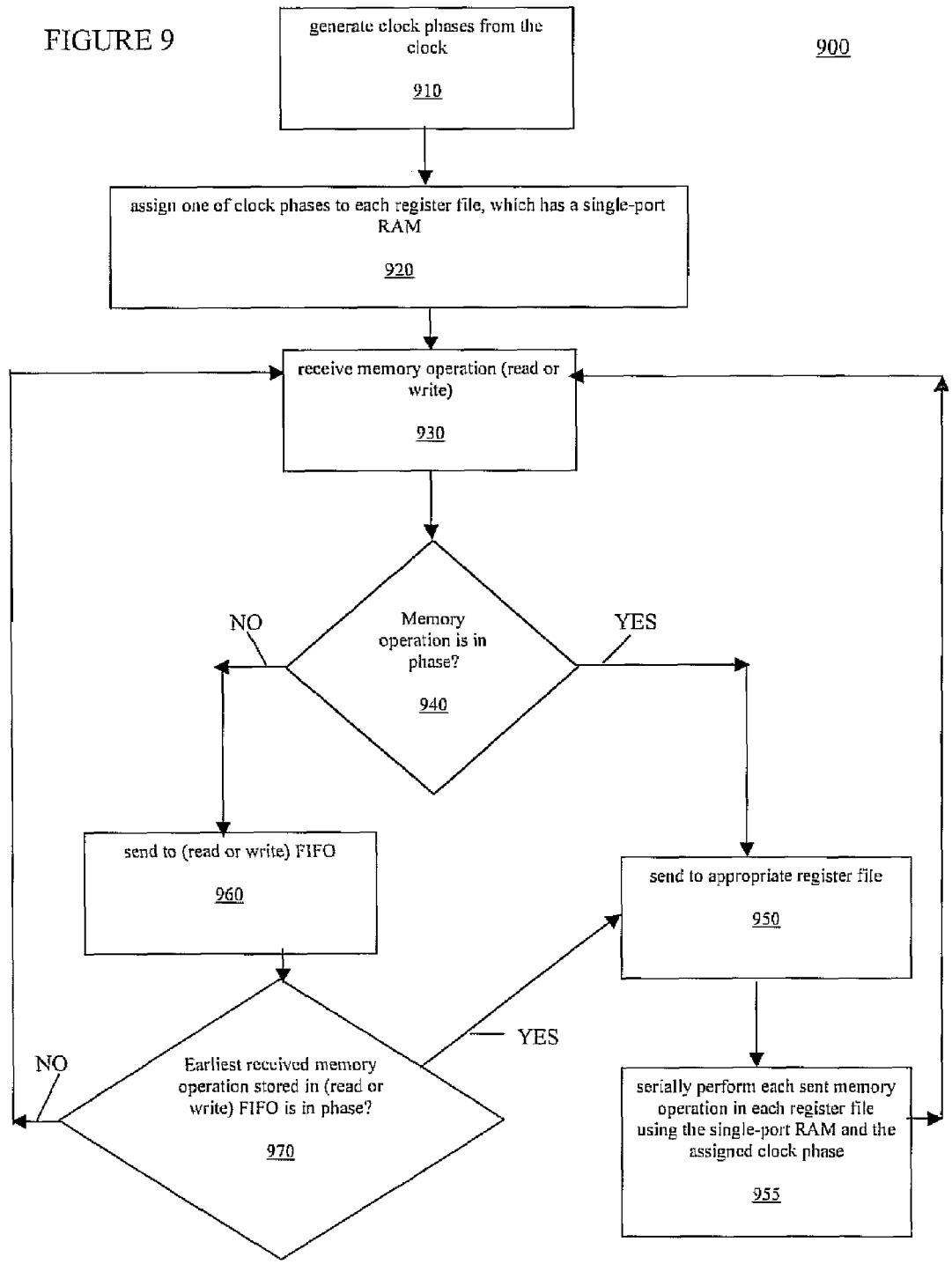

ARCHITECTURE FOR COMPACT MULTI-PORTED REGISTER FILE

BACKGROUND OF THE INVENTION

1. Field of the Invention

Embodiments of the present invention generally relate to performing read operations and write operations. More particularly, embodiments of the present invention relate to performing read operations and write operations utilizing an architecture for compact multi-ported register file.

2. Related Art

Register files are utilized in a variety of electrical applications. Typically, the register files are used to store the operands for an instruction to be executed. Register files are incorporated in some hardware devices. An example of a hardware device having register files is a graphics processing unit (GPU). The GPU is a semiconductor device that specializes in rapidly processing graphical data compared to a typical central processing unit (CPU).

Within the GPU, there is a graphics shader that performs numerous operations on graphical data to obtain desired optical features and that interfaces with a texture unit. The texture unit further modifies the graphical data to have desired texture and optical features. In some implementations, the texture unit is implemented as part of the graphics shader. Generally, the fabricated GPU utilizes most of the semiconductor area available on the semiconductor chip die. In particular, the graphics shader uses a significant portion of the semiconductor area. Moreover, the processing speed of the GPU is measured by the amount of graphical data that is processed in any time period. Further, the amount of graphical data that can be processed by the graphics shader substantially affects the processing speed of the GPU. Hence, improvements in processing by the graphics shader lead to performance enhancements for the GPU.

Typically, the graphics shader processes data groups of graphical data. The size of these data groups depends on various factors. These data groups can have one or more fragments. A fragment includes a variety of information such as associated pixel location, a depth value, and a set of interpolated parameters such as a color, a secondary color, and one or more texture coordinate sets. If the fragment passes though the various stages of the graphical pipeline of the GPU, the fragment updates a pixel in the frame buffer. That is, the fragment can be thought of as a "potential pixel". In processing these data groups of fragments, the graphics shader needs to perform read operations and write operations. Typically, the graphics shader includes one or more register files that perform the read operations and the write operations. Usually, each register file is designed to handle the number of read and write operations requested during the processing of the data group of fragments. As an example, the register file may be designed to handle two read (2R) operations and two write (2W) operations.

FIG. 1A illustrates a first conventional register file 100A that handles two read (2R) operations and two write (2W) operations. As depicted in FIG. 1A, the first conventional register file 100A includes a 4-port RAM (Random Access Memory) 50. Typically, the first conventional register file 100A also has one or more registers. The 4-port RAM 50 has a first read port 10, a second read port 12, a first write port 14, and a second write port 16. These ports 10-16 receive the address of the memory location to be read from or to be written to. Moreover, the 4-port RAM 50 has data inputs for the write operation, data outputs for the read operation, and control inputs for control signals.

Although the first conventional register file 100A can simultaneously handle two read (2R) operations and two write (2W) operations, the use of multiple ports increases the size of the 4-port RAM 50 (and of the register file 100A) and reduces the memory capacity of the 4-port RAM 50 (and of the register file 100A).

FIG. 1B illustrates a second conventional register file 100B that handles two read (2R) operations and two write (2W) operations. As depicted in FIG. 1B, the second conventional register file 100B includes a first dual-port RAM 51 and a second dual port RAM 52. Typically, the second conventional register file 100B also has one or more registers. The first dual-port RAM 51 includes a first read port 40 and a first write port 42. The second dual-port RAM 52 includes a first read port 44 and a first write port 46. These ports 40-46 receive the address of the memory location to be read from or to be written to. Moreover, the dual-port RAMs 51 and 52 have data inputs for the write operation, data outputs for the read operation, and control inputs for control signals. An even/odd bank implementation enables the dual-port RAMS 51 and 52 to handle two read (2R) operations and two write (2W) operations, wherein each dual RAM performs one of the read operations and one of the write operations.

Use of dual-port RAMs 51 and 52 decreases the size of the register file 100B and enables an increase in memory capacity compared to the register file 100A. Unfortunately, the even/odd bank implementation requires additional complicated logic circuitry and software to avoid bank conflicts, which occur when two read or two write operations request access to the same bank. Also, increases in the memory capacity of the register file 100B require the addition of two dual-port RAMs even if a single dual-port RAM would be sufficient, leading to unnecessary resources being included in the register file 100B.

SUMMARY OF THE INVENTION

Architecture for compact multi-ported register file is disclosed. In an embodiment, a register file comprises a single-port random access memory (RAM). The single-port RAM has a single port for read operations and for write operations. Either a single read or a single write operation is performed for a given clock via the single port. Moreover, the single-port RAM serially performs N read operations and M write operations associated with a data group using a clock phase of (N+M) clock phases generated from a clock.

In another embodiment, a semiconductor device includes the architecture for compact multi-ported register file. The semiconductor device comprises a plurality of register files. Each register file comprises a random access memory (RAM) comprising a port for read operations and for write operations. Moreover, each RAM serially performs N read operations and M write operations associated with one of a plurality of data groups using a corresponding clock phase of (N+M) clock phases generated from a clock. Further, the semiconductor device comprises an input staging unit for staging write data of one or more of the write operations. The input staging unit is coupled to the plurality of register files. Continuing, the semiconductor device comprises an output staging unit for staging read data of one or more of the read operations. The output staging unit is coupled to the plurality of register files. The semiconductor device can be a graphics processing unit (GPU).

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 9 illustrates a flow chart showing a method of operating a plurality of register files units in accordance with an embodiment of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1A:
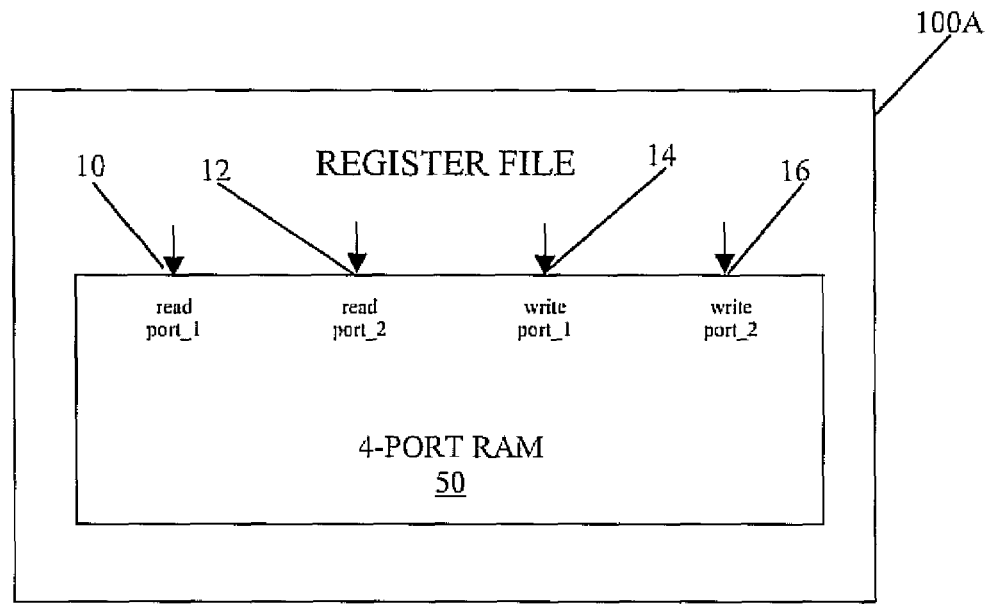
FIG. 1A illustrates a first conventional register file.

As described above, improvements in the graphics shader lead to performance enhancements for the GPU. The present invention will focus on a new architecture for compact multi-ported register file that will deliver improvements in the graphics shader (and in the GPU). The register files 100A (FIG. 1A) and 100B (FIG. 1B) have deficiencies that are overcome by the architecture for compact multi-ported register file of the present invention. This architecture for compact multi-ported register file provides a significant reduction in the size of the register file. This reduction is generally achieved by incorporating a RAM with less ports into the register file. Since the semiconductor area used by the register file is reduced, there is additional semiconductor area for expanding the graphics shader. Hence, the graphics shader is able to process a greater amount of graphical data in any time period. Moreover, the architecture for compact multi-ported register file can be scaled to support any desired number of read operations and/or write operations, increasing the amount of graphical data (e.g., fragments) processed in any time period.

Figure 2A:
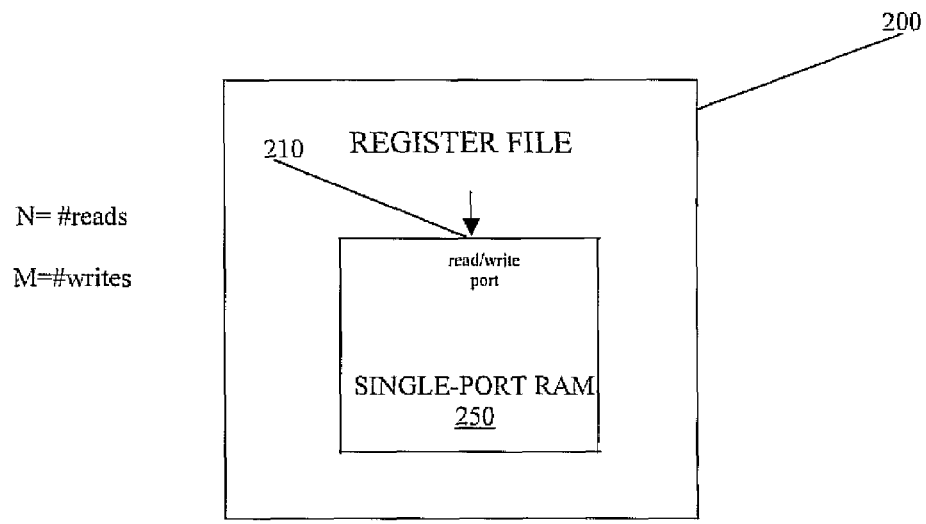
FIG. 2A illustrates a register file in accordance with an embodiment of the present invention.

FIG. 2A illustrates a register file 200 in accordance with an embodiment of the present invention. As depicted in FIG. 2A, the register file 200 includes a single-port RAM 250. The single-port RAM 250 includes a single port 210 for read operations and for write operations. Either a single read or a single write operation is performed for a given clock via the single port 210. The single port 210 receives the address of the memory location to be read from or to be written to. Moreover, the single-port RAM 250 has data inputs for the write operation, data outputs for the read operation, and control inputs for control signals. Further, the register file 200 may have one or more registers as well as other components.

Figure 2B:
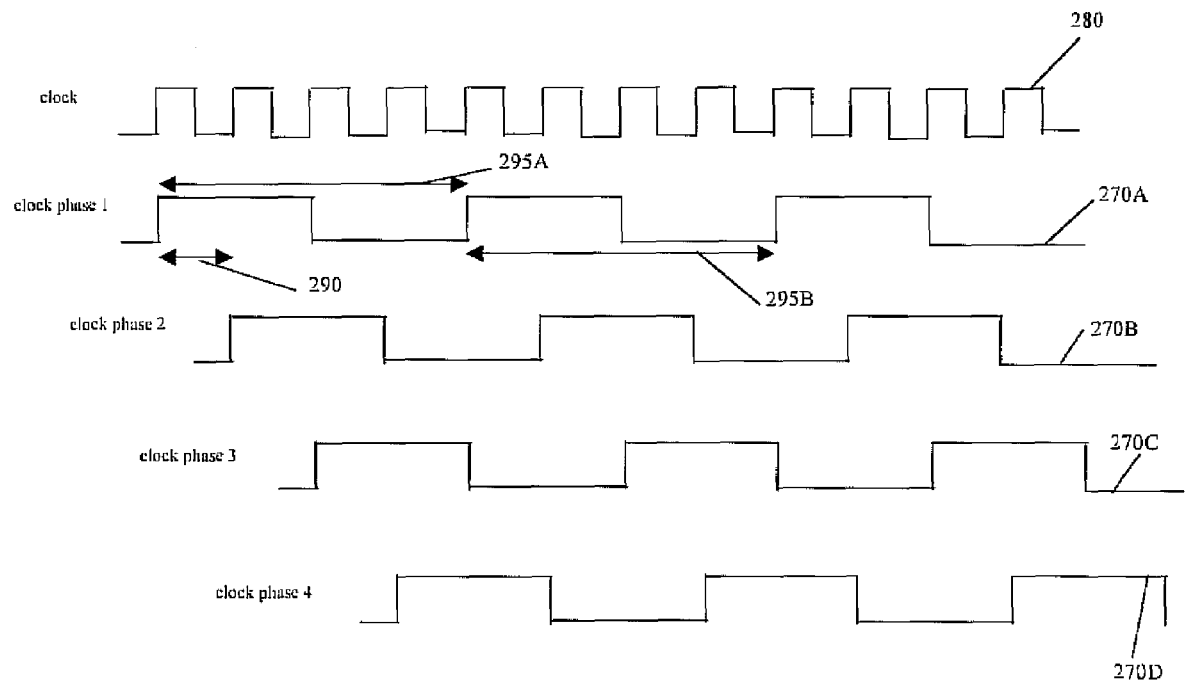
FIG. 2B illustrates creation of multiple clock phases in accordance with an embodiment of the present invention.

The single-port RAM 250 serially performs read operations and write operations. In particular, the single-port RAM 250 is able to serially perform N read operations and M write operations. This is possible because multiple clock phases are generated from a clock, as shown in FIG. 2B. Rather than using the clock 280, the single-port RAM 250 (and register file 200) uses one of the clock phases 270A-270D. Each clock phase 270A-270D is shifted one clock cycle 290 from each other. If the single-port RAM 250 needs to serially perform N read operations and M write operations, (N+M) clock phases are generated.

As described above, the graphics shader processes data groups of graphics data. In an embodiment, the graphics data are fragments. These data groups include one or more fragments. For example, each data group can have four fragments. A data group having four fragments is a quad. Thus, there are a plurality of quads that are processed by the graphics shader.

In an embodiment, the register file 200 is able to handle two read (N=2) operations and two write (M=2) operations requested during the processing of a quad by using a clock phase 270A of four (N+M=4) clock phases 270A-270D generated from the clock 280. Since clock phases 270A-270D are shifted by one clock cycle 290 from each other, the clock phases 270A, 270B, 270C, and 270D begin at clock cycles 1, 2, 3, and 4, respectively. During four clock cycles (e.g., 1st, 2nd, 3rd, and 4th clock cycles) of the clock 280, the clock phase 270A completes a clock cycle 295A. Further, in the four clock cycles (e.g., 1st, 2nd, 3rd, and 4th clock cycles) of the clock 280, the single-port RAM 250 performs the first read operation, the second read operation, the first write operation, and the second write operation, respectively, associated with a quad. Thus, the 1st and 2nd clock cycles represent the read phase of the clock phase 270A while the 3rd and 4th clock cycles represent the write phase of the clock 270A. After the fourth clock cycle, the single-port RAM 250 is ready to perform another two read operations and another two write operations for another quad during the next four clock cycles (e.g., 5th, 6th, 7th, and 8th clock cycles) of the clock 280. These next four clock cycles correspond to the second clock cycle 295B of clock phase 270A.

Since four clock phases 270A-270D were generated from the clock 280, the other three clock phases 270B-270D can be individually assigned to three additional register files having the configuration of register file 200. This provides an efficient implementation because these three additional register files are able to perform two read (N=2) operations and two write (M=2) operations requested during the processing of three other quads. That is, two read (N=2) operations and two write (M=2) operations for four quads can be concurrently performed by four register files having the configuration of register file 200. Further, as a register file completes the read and write operations for a particular quad, the register file is able to perform another two read operations and another two write operations for a next quad that has not been assigned to another register file. Although as described herein the four clock cycles are used to perform two read operations and two write operations, it should be understood that the four clock cycles can be used for any combination of read and write operations. For instance, the operations performed can be one read and three write operations, four read operations, four write operations, three read and one write operations, etc.

The architecture for compact multi-ported register file of the present invention enables increasing the number of operations performed by the register file 200 by increasing the number of clock phases 270A-270D. Moreover, as the number of clock phases 270A-270D is increased, the number of register files (having the configuration of register file 200) concurrently performing read and write operations can be increased.

Figure 1B:
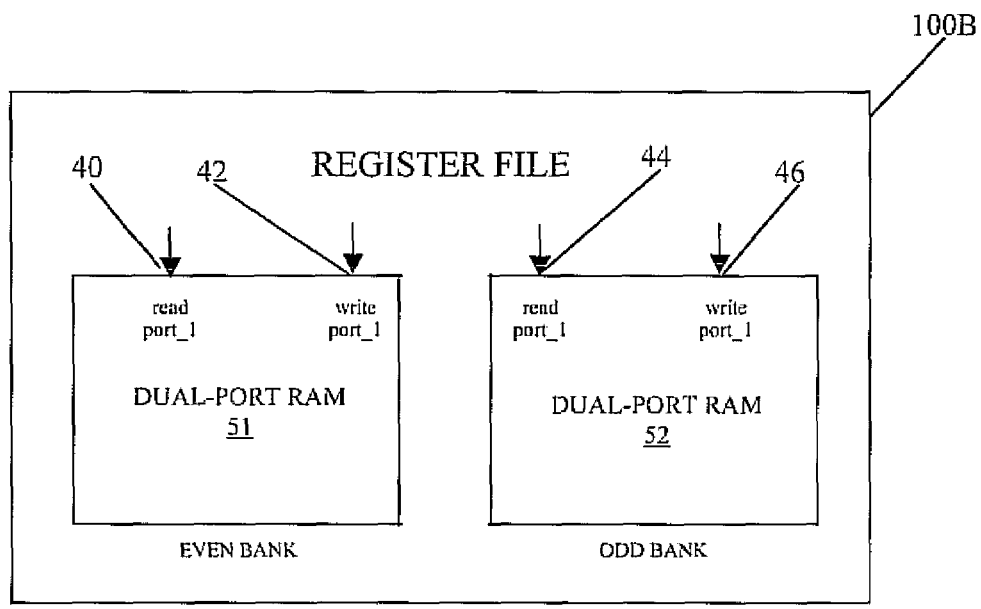
FIG. 1B illustrates a second conventional register file.

In contrast to register files 100A (FIG. 1A) and 100B (FIG. 1B), the register file 200 provides at least a 50% reduction in semiconductor area for comparable memory sizes. A port requires supporting circuitry. The greater the number of ports the larger the supporting circuitry. The single-port RAM requires less supporting circuitry than the register files 100A (FIG. 1A) and 100B (FIG. 1B). That is, the single-port RAM is significantly more efficient in terms of area and memory capacity because a single set of decoders and sense amplifiers are required per bit of memory. Further, the even/odd bank implementation is eliminated. This avoids the need for additional complicated logic circuitry and software to avoid bank conflicts, saving additional semiconductor area. This also results in significant higher GPU performance since bank conflicts would result in additional graphics shader program passes to complete the desired register file access in the next clock cycle for the requested read or write operation.

Furthermore, the minimum granularity for the amount of register file space allocated for a given quad is no longer required to be even numbered. Increases in memory capacity simply require the addition of one or more register files having a single-port RAM, leading to inclusion of needed resources and avoiding wasted resources.

Figure 3A:
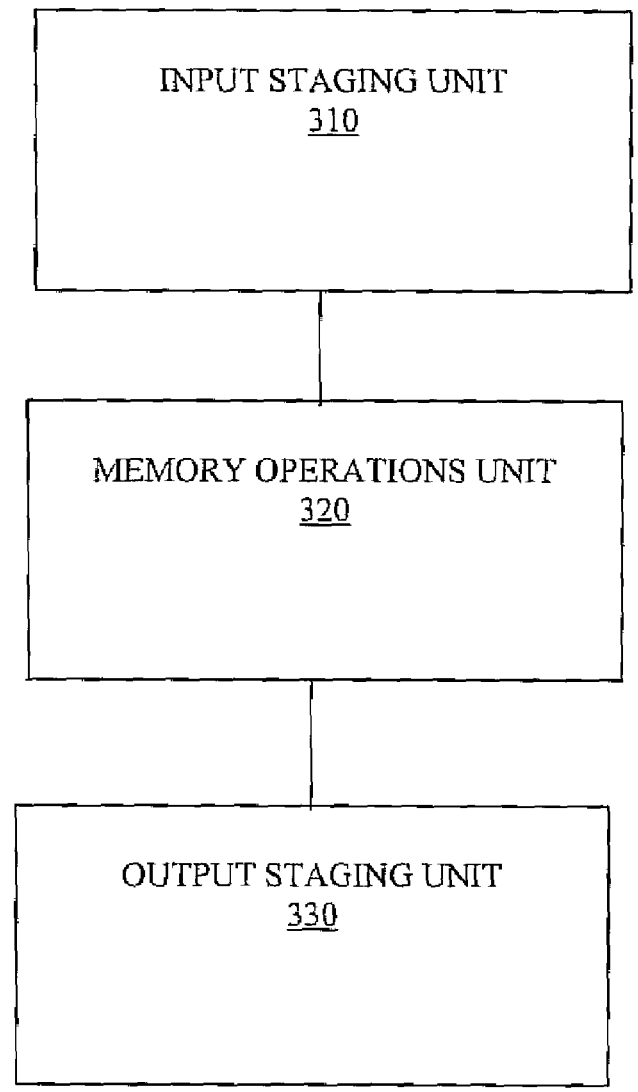
FIG. 3A illustrates an architecture for compact multi-ported register file in accordance with an embodiment of the present invention.

FIG. 3A illustrates an architecture 300 for compact multi-ported register file in accordance with an embodiment of the present invention. As shown in FIG. 3A, the architecture 300 for compact multi-ported register file includes an input staging unit 310, a register file 320, and an output staging unit 330.

The register file 320 includes a plurality of register file units having the configuration of register file 200 (FIG. 2A). The input staging unit 310 is utilized for staging write data of one or more of the write operations to be performed by the register files since multiple write operations (and corresponding write data) may be concurrently requested by the graphics shader. Further, the input staging unit 310 is coupled to the register file 320. The output staging unit 330 is utilized for staging read data of one or more of the read operations performed by the register files since multiple read data may need to be concurrently sent to the graphics shader. The output staging unit 330 is coupled to the register file 320. As will be discussed below, the input staging unit 310 shares its resources with the register file units of the register file 320. For example, the input staging unit 310 utilizes multiplexers to provide the register files access to an input staging register rather than providing each register file unit with an input staging register. Similarly, the output staging unit 330 shares its resources with the register file units of the register file 320. For example, the output staging unit 330 utilizes multiplexers to provide the register files access to an output staging register rather than providing each register file unit with an output staging register. As a result, duplication of resources is minimized, reducing the costs of adding the input staging unit 310 and the output staging unit 330. Moreover, the configuration of the input staging unit 310 is primarily dependent on the number (M) of write operations to be performed while the configuration of the output staging unit 330 is primarily dependent on the number (N) of read operations to be performed.

Figure 3B:
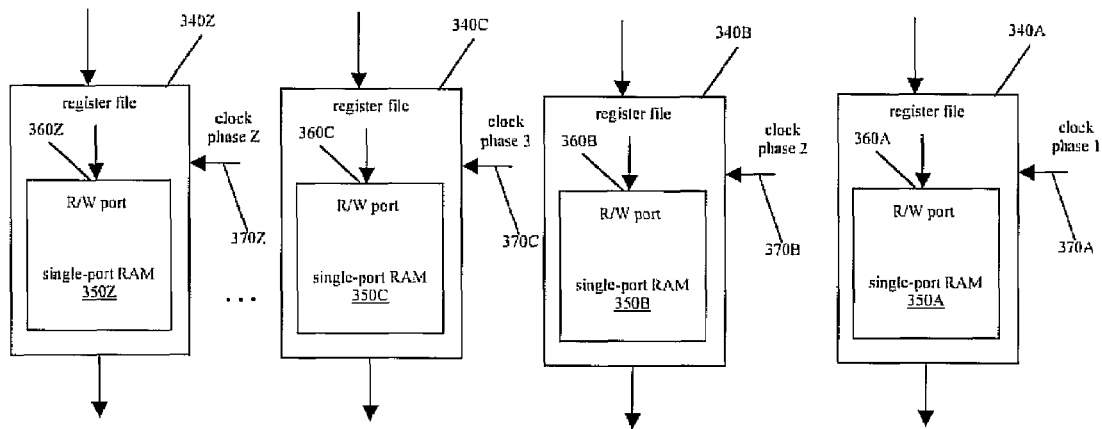
FIG. 3B illustrates the register file of the architecture for compact multi-ported register file of FIG. 3A in accordance with an embodiment of the present invention.

FIG. 3B illustrates the register file 320 of the architecture 300 for compact multi-ported register file of FIG. 3A in accordance with an embodiment of the present invention. As depicted in FIG. 3B, the register file 320 has a plurality of register file units 340A-340Z. Each register file unit 340A-340Z includes a single-port RAM 350A-350Z having a single port 360A-360Z for read operations and for write operations. Each single-port RAM 350A-350Z serially performs N read operations and M write operations associated with one of a plurality of data groups (e.g., quads) using a corresponding clock phase of (N+M) clock phases generated from a clock. If Z is the number of register file units 340A-340Z in the register file 320, the efficiency of the register file 320 is maximized when Z=(N+M) since the read and write operations associated with Z quads are concurrently performed. If Z is less than (N+M), some processing capacity remains unused and clock cycles are wasted.

Figure 4A:
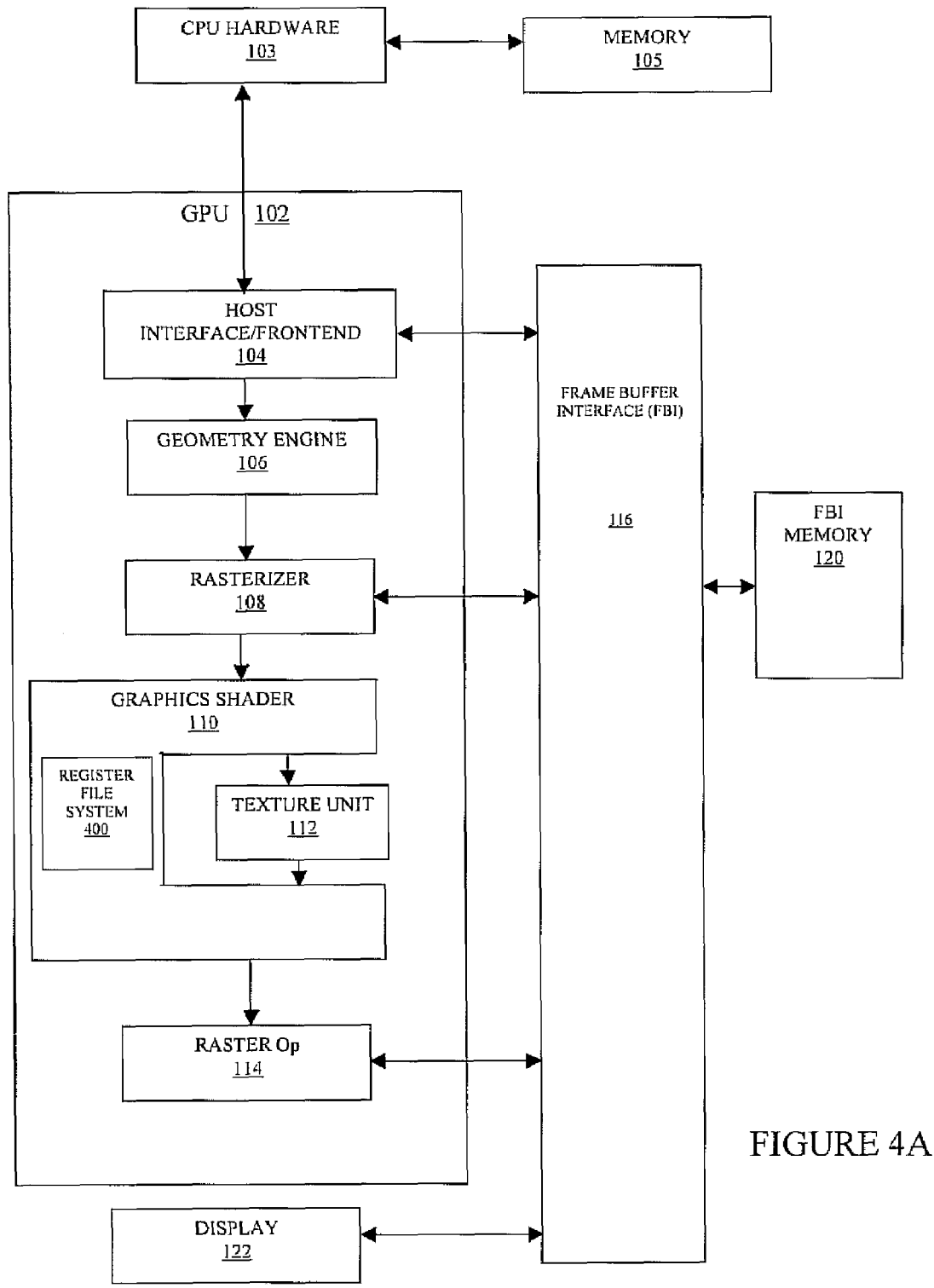
FIG. 4A illustrates a graphics processing unit in accordance with an embodiment of the present invention, showing a graphics shader having a register file system.

FIG. 4A illustrates a graphics processing unit GPU 102 in accordance with an embodiment of the present invention, showing a graphics shader 110 having a register file system 400. As depicted in FIG. 4A, the GPU 102 has a host interface/front end 104. The host interface/front end 104 receives raw graphics data from central processing hardware 103 that is running an application program stored in memory 105. The host interface/front end 104 buffers input information and supplies that information to a geometry engine 106. The geometry engine 106 produces, scales, rotates, and projects three-dimensional vertices of graphics primitives in "model" coordinates into 2-dimensional frame buffer coordinates. Typically, triangles are used as graphics primitives for three dimension objects, but rectangles are often used for 2-dimensional objects (such as text displays).

The 2-dimensional frame buffer coordinates of the vertices of the graphics primitives from the geometry engine 106 are applied to a rasterizer 108. The rasterizer 108 determines the positions of all of the pixels within the graphics primitives. This is typically performed along raster (horizontal) lines that extend between the lines that define the graphics primitives. The rasterizer 108 also generates interpolated colors, depths and other texture coordinates for each pixel. The output of the rasterizer 108 is also referred to as rasterized pixel data or fragments.

The rasterized pixel data or fragments are applied to a graphics shader 110 that adds texture and optical features related to fog and illumination to the rasterized pixel data or fragments to produce shaded pixel data or fragments. The graphics shader 110 can have a multiple shader pipeline structure. The graphics shader includes a register file system 400 (See FIG. 4B). Further, the graphics shader 110 includes a texture engine 112 that modifies the rasterized pixel data or fragments to have the desired texture and optical features. The texture engine 112 can be implemented using a hardware pipeline that can process large amounts of data at very high speed. The shaded pixel data or fragments are input to a Raster Operations Processor 114 that performs vertex processing on the shaded pixel data or fragments. The result from the Raster Operations Processor 114 is frame pixel data or fragments that are stored in a frame buffer memory 120 by a frame buffer interface 116. The frame pixel data can be used for various processes such as driving a display 122. Frame pixel data can be made available as required by way of the frame buffer interface 116.

Figure 4B:
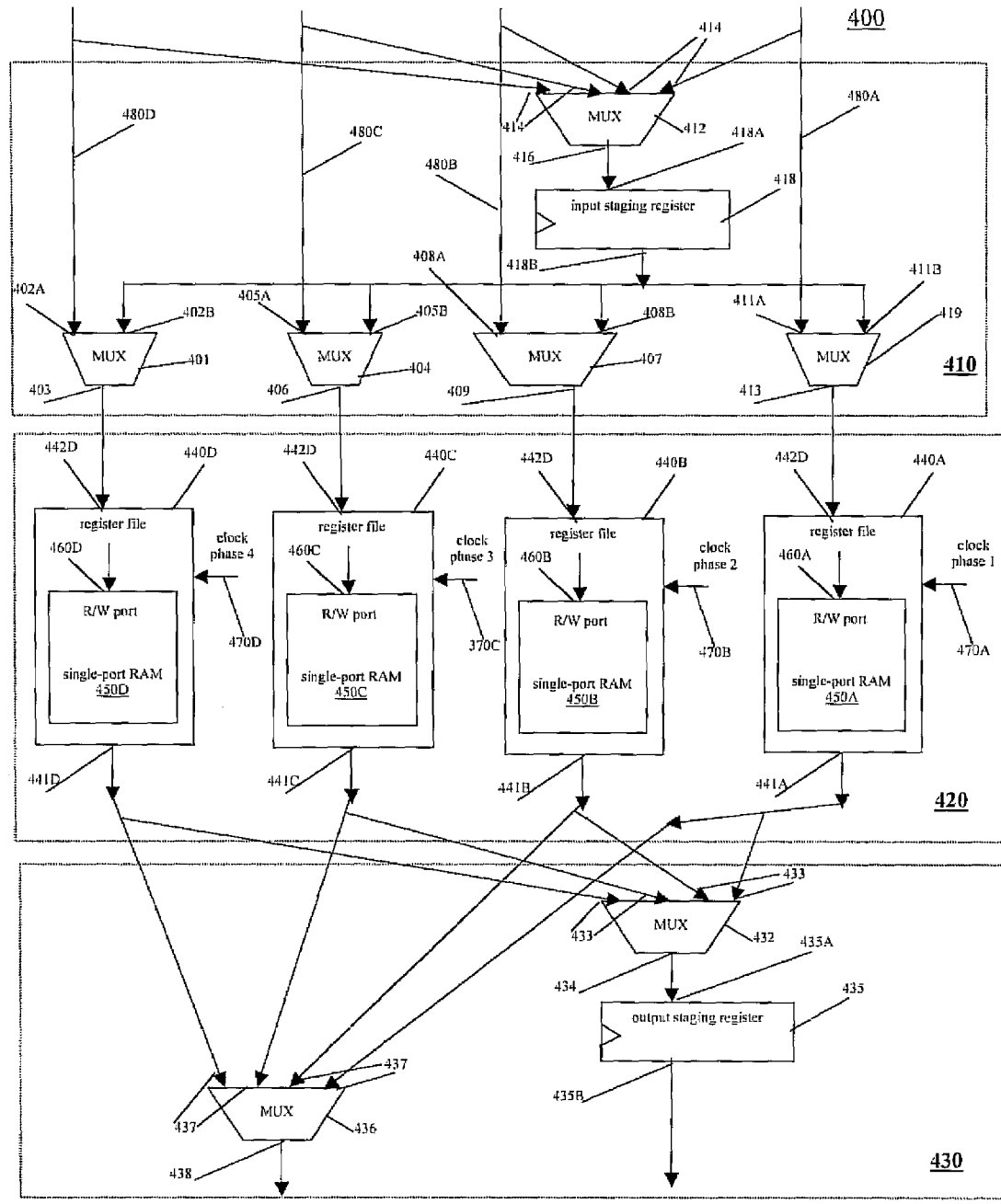
FIG. 4B illustrates the register file system of FIG. 4A in accordance with an embodiment of the present invention.

FIG. 4B illustrates the register file system 400 of FIG. 4A in accordance with an embodiment of the present invention, wherein the register file system 400 incorporates architecture 300 for compact multi-ported register file described in FIG. 3A. Here, it will be assumed that the graphics shader 110 requests two read (2R) operations and two write (2W) operations during processing of the data group. Further, it will be assumed that the data group is a quad (or four fragments). It should be understood that these assumptions can be changed to provide a different configuration for the register file system 400.

As shown in FIG. 4B, the register file system 400 includes an input staging unit 410, a register file 420, and an output staging unit 430. The register file 420 has four register file units 440A-440D. Each register file unit 440A-440D includes a single-port RAM 450A-450D having a single port 460A-460D for read operations and for write operations. Each single-port RAM 450A-450D serially performs 2 (N=2) read operations (e.g., a first read operation R1 and a second read operation R2) and 2 (M=2) write operations (e.g., a first write operation W1 and a second write operation W2) associated with one of a plurality of data groups (e.g., quads) using a corresponding clock phase of four clock phases 470A-470D generated from a clock. Here, Z is the number of register file units 440A-440D. Thus, Z is 4 (N+M).

The input staging unit 410 is used for staging the write data WD2 of the second write operation W2 to be performed by each single-port RAM 450A-450D of each register file unit 440A-440D, as will be explained with reference to FIGS. 7A-7D. In an embodiment, the input staging unit 410 has a write staging multiplexer 412, a write staging register 418, and a plurality of input multiplexers 401, 404, 407, and 419.

The write staging multiplexer 412 has an output 416 and a plurality of inputs 414. Each input 414 is coupled to one of a plurality of lines 480A-480D. Each line 480A-480D transmits operations (e.g., read operation and write operation) to be performed by a corresponding register file unit 440A-440D. One of the inputs 414 is selectively coupled to the output 416 based on current clock cycle.

Moreover, the write staging register 418 has an output 418B and an input 418A coupled to the output 416 of the write staging multiplexer 412. The write staging register 418 stores the second write data WD2 for a second write operation W2 to be performed in a next clock cycle while the first write data WD1 is utilized in a first write operation W1 performed in a current clock cycle.

Each input multiplexer 401, 404, 407, and 419 has a respective output 403, 406, 409, and 413 coupled to an input 442A-442D of a respective register file unit 440A-440D. Moreover, each input multiplexer 401, 404, 407, and 419 further includes a first input 402A, 405A, 408A, and 411A coupled to a respective line 480A-480D and a second input 402B, 405B, 408B, and 411B coupled to the output 418B of the write staging register 418. One of the inputs 402A, 405A, 408A, 411A, 402B, 405B, 408B, and 411B is selectively coupled to the output 403, 406, 409, and 413 of each input multiplexer 401, 404, 407, and 419 based on current clock cycle.

The output staging unit 430 is used for staging read data RD1 of the first read operation R1 performed by each single-port RAM 450A-450D of each register file unit 440A-440D, as will be explained with reference to FIGS. 6A-6D. In an embodiment, the output staging unit 430 has a read staging multiplexer 432, a read staging register 435, and an output multiplexer 436.

The read staging multiplexer 432 has an output 434 and a plurality of inputs 433. Each input 433 is coupled to an output 441A-441D of a respective register file unit 440A-440D. Each output of 441A-441D of the respective register file unit 440A-440D outputs read data RD. One of the inputs 433 of the read staging multiplexer 432 is selectively coupled to the output 434 of the read staging multiplexer 432 based on current clock cycle.

Further, the read staging register 435 has an output 435B and an input 435A coupled to the output 434 of the read staging multiplexer 432. The read staging register 435 stores first read data RD1 from the first read operation R1 performed in a current clock cycle while the second read data RD2 is available from the second read operation R2 performed in a next clock cycle.

The output multiplexer 436 has an output 438 and a plurality of inputs 437. Each input 437 is coupled to the output of 441A-441D of the respective register file unit 440A-440D. One of the inputs 437 is selectively coupled to the output 438 of the output multiplexer 436 based on current clock cycle. The read staging register 435 outputs the first read data RD1 in the next clock cycle.

In practice, the first (Z−3)th register file unit 440A receives and serially performs two read and two write operations associated with the 1st, 5th, 9th, 13th, 17th, . . . , [(k*Z)−3th], etc. quads, where Z is 4 and k is an integer greater than zero. The second (Z−2)th register file unit 440B receives and serially performs two read and two write operations associated with the 2nd, 6th, 10th, 14th, 18th, . . . , [(k*Z)−2th], etc. quads, where Z is 4 and k is an integer greater than zero. Moreover, the third (Z−1)th register file unit 440C receives and serially performs two read and two write operations associated with the 3rd, 7th, 11th, 15th, 19th, . . . , [(k*Z)−1th], etc. quads, where Z is 4 and k is an integer greater than zero. Further, the fourth (Z)th register file unit 440D receives and serially performs two read and two write operations associated with the 4th, 8th, 12th, 16th, 20th, . . . , [(k*Z)−1th], etc. quads, where Z is 4 and k is an integer greater than zero.

Figure 5:
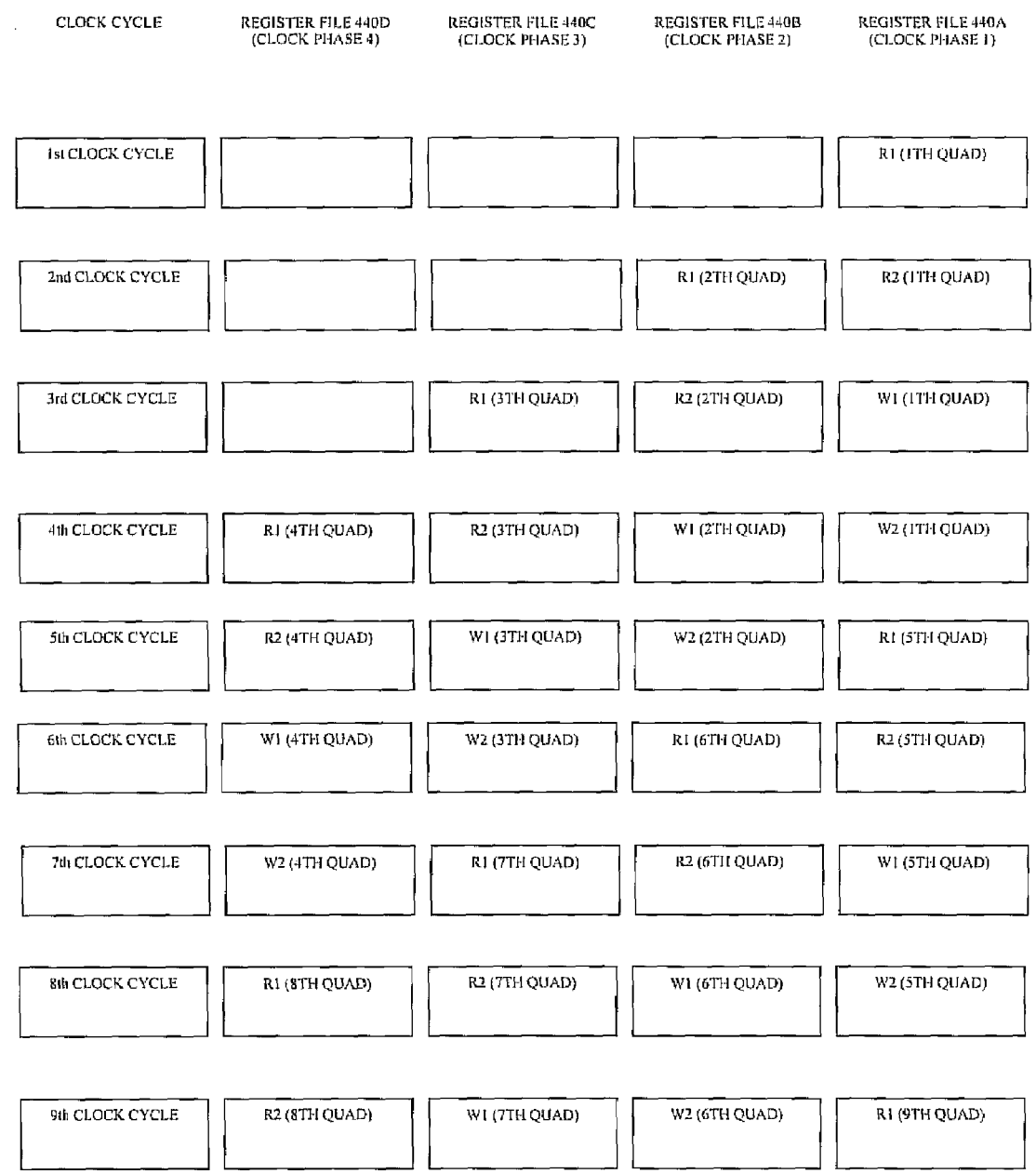
FIG. 5 illustrates operation of the register files of FIG. 4B in accordance with an embodiment of the present invention.

FIG. 5 illustrates operation of the register file units 440A-44D of FIG. 4B in accordance with an embodiment of the present invention. As depicted in FIG. 5, register file unit 440A, which is assigned clock phase 1, performs two read (R1 and R2) operations and two write (W1 and W2) operations associated with the 1th quad during 1st through 4th clock cycles. Moreover, register file unit 440A performs two read (R1 and R2) operations and two write (W1 and W2) operations associated with the 5th quad during 5th through 8th clock cycles. Further, register file unit 440A performs a first read (R1) operation associated with the 9th quad during 9th clock cycle.

Still referring to FIG. 5, register file unit 440B, which is assigned clock phase 2, performs two read (R1 and R2) operations and two write (W1 and W2) operations associated with the 2th quad during 2nd through 5th clock cycles. Moreover, register file unit 440B performs two read (R1 and R2) operations and two write (W1 and W2) operations associated with the 6th quad during 6th through 9th clock cycles.

Register file unit 440C, which is assigned clock phase 3, performs two read (R1 and R2) operations and two write (W1 and W2) operations associated with the 3th quad during clock cycles 3 through 6. Moreover, register file unit 440C performs two read (R1 and R2) operations and a first write (W1) operation associated with the 7th quad during clock cycles 7 through 9.

Register file unit 440D, which is assigned clock phase 4, performs two read (R1 and R2) operations and two write (W1 and W2) operations associated with the 4th quad during 4th through 7th clock cycles. Moreover, register file unit 440D performs two read (R1 and R2) operations associated with the 8th quad during 8th through 9th clock cycles.

Figure 6A:
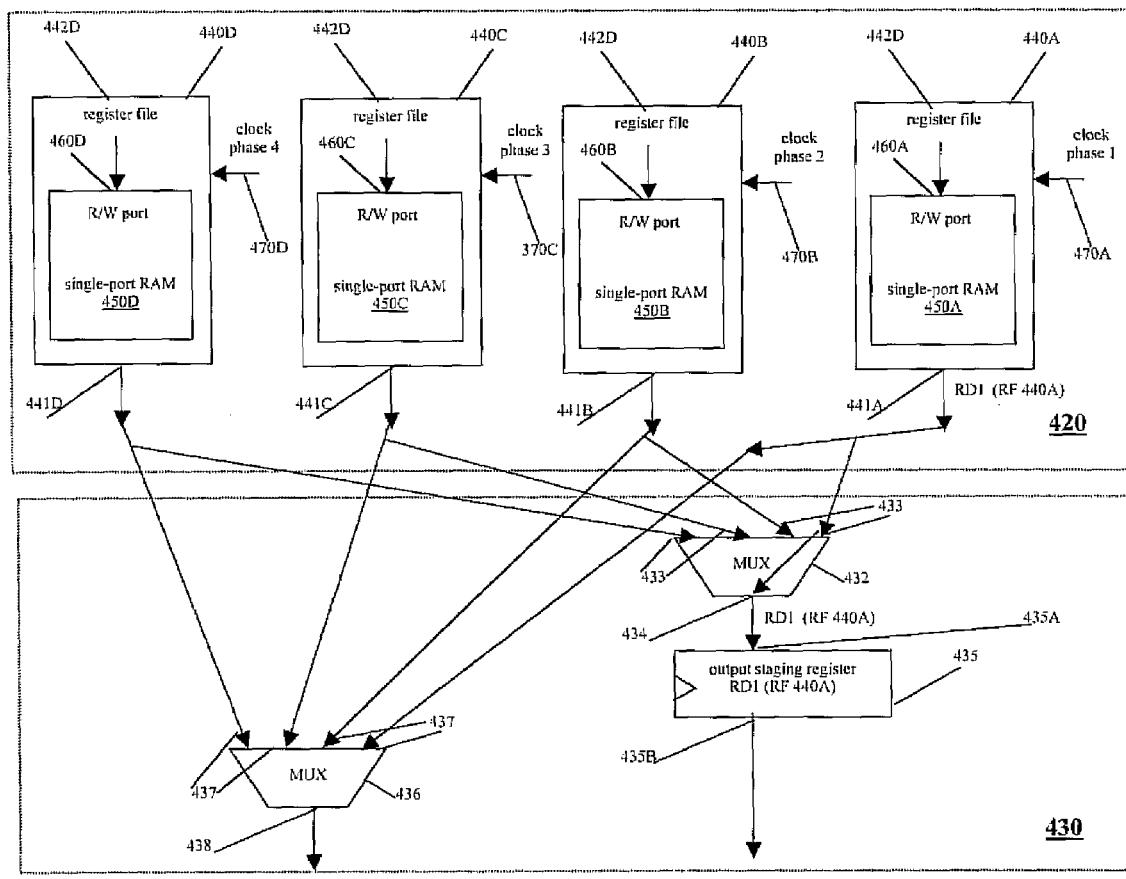
FIGS. 6A-6D illustrate operation of an output staging unit of FIG. 4B in accordance with an embodiment of the present invention.

FIGS. 6A-6D illustrate operation of the output staging unit 430 of FIG. 4B in accordance with an embodiment of the present invention. During 1st clock cycle as illustrated in FIG. 6A, the register file unit 440A outputs the first read data (RD1) via its output 441A and sends RD1 to the read staging multiplexer 432. The read staging multiplexer 432 couples the RD1 to its output 434 that is coupled to the input 435A of the read staging register 435. Then, the RD1 is stored in the read staging register 435.

Figure 6B:
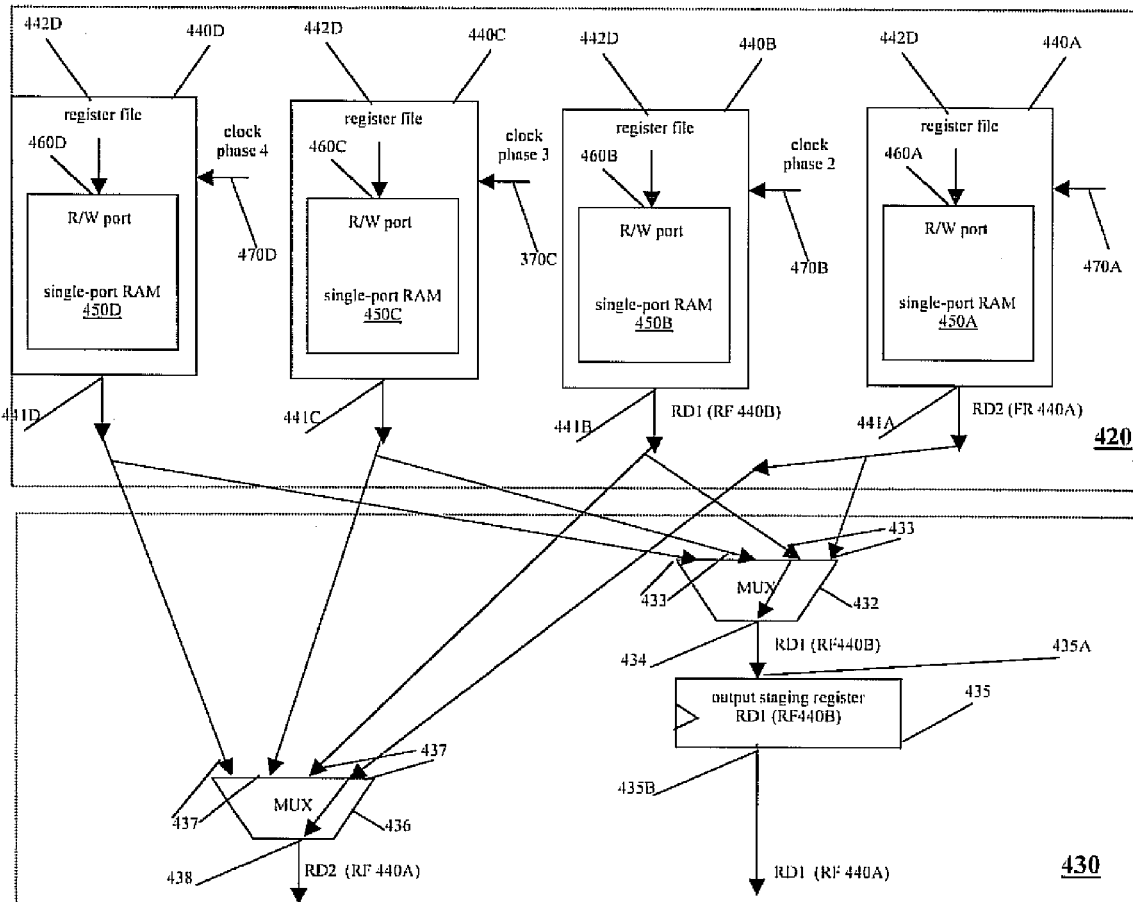

During 2nd clock cycle as illustrated in FIG. 6B, the register file unit 440A outputs the second read data (RD2) via its output 441A and sends RD2 to the output staging multiplexer 436. The output staging multiplexer 436 couples the RD2 to its output 438. Moreover, the read staging register 435 outputs the RD1 stored during 1st clock cycle. Hence, RD1 from register file 440A is available at the output 435B of the read staging register 435 while the RD2 from register file unit 440A is available at the output 438 of the output staging multiplexer 436.

Meanwhile, the register file unit 440B outputs the first read data (RD1) via its output 441B and sends RD1 to the read staging multiplexer 432. The read staging multiplexer 432 couples the RD1 to its output 434 that is coupled to the input 435A of the read staging register 435. Then, the RD1 from register file unit 440B is stored in the read staging register 435.

Figure 6C:
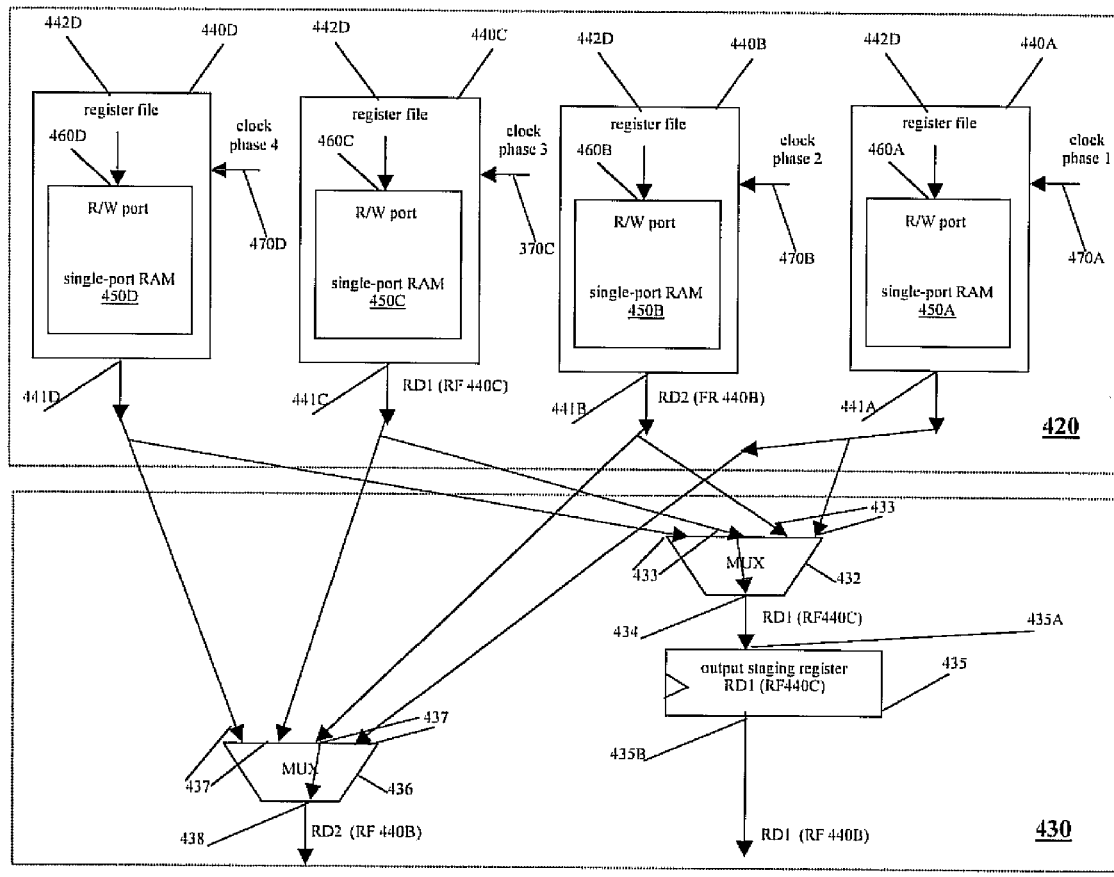

During 3rd clock cycle as illustrated in FIG. 6C, the register file 440B outputs the second read data (RD2) via its output 441B and sends RD2 to the output staging multiplexer 436. The output staging multiplexer 436 couples the RD2 to its output 438. Moreover, the read staging register 435 outputs the RD1 stored during 2nd clock cycle. Hence, RD1 from register file unit 440B is available at the output 435B of the read staging register 435 while the RD2 from register file unit 440B is available at the output 438 of the output staging multiplexer 436.

Meanwhile, the register file unit 440C outputs the first read data (RD1) via its output 441C and sends RD1 to the read staging multiplexer 432. The read staging multiplexer 432 couples the RD1 to its output 434 that is coupled to the input 435A of the read staging register 435. Then, the RD1 from register file unit 440C is stored in the read staging register 435.

Figure 6D:
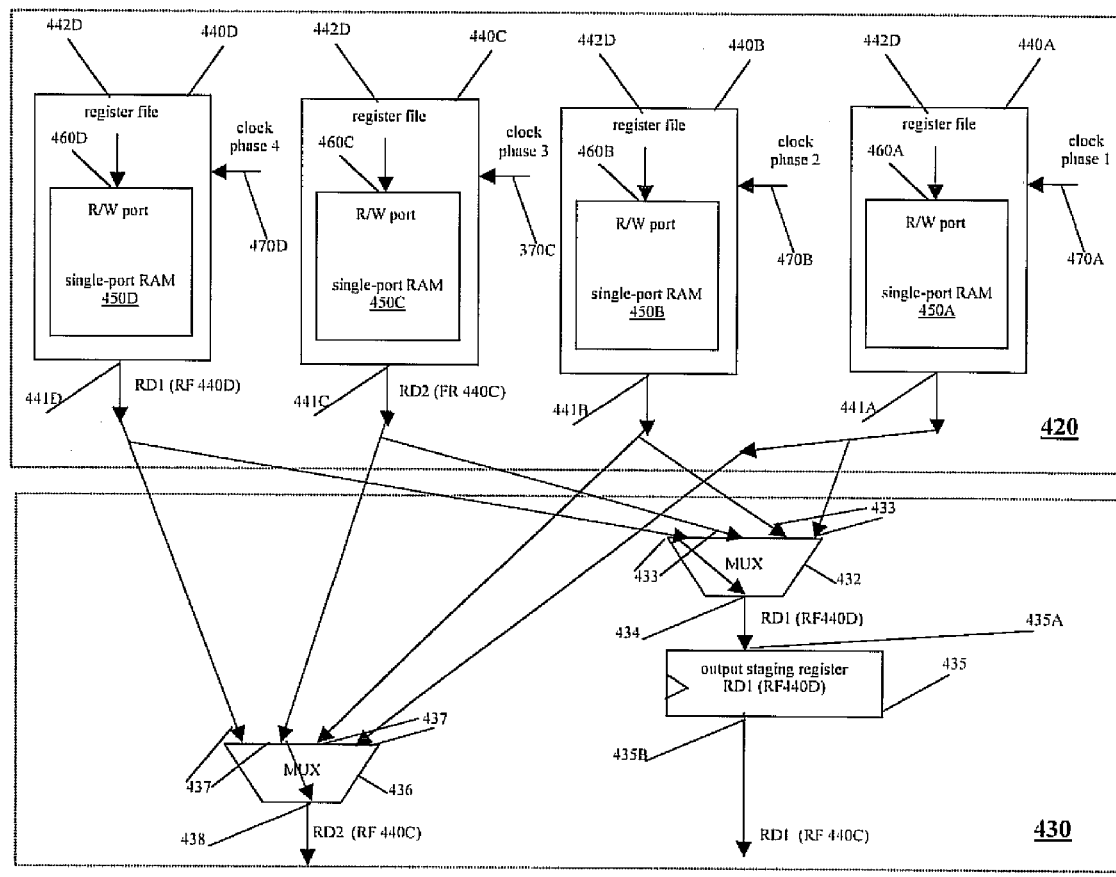

During 4th clock cycle as illustrated in FIG. 6D, the register file unit 440C outputs the second read data (RD2) via its output 441C and sends RD2 to the output staging multiplexer 436. The output staging multiplexer 436 couples the RD2 to its output 438. Moreover, the read staging register 435 outputs the RD1 stored during 3rd clock cycle. Hence, RD1 from register file unit 440C is available at the output 435B of the read staging register 435 while the RD2 from register file unit 440C is available at the output 438 of the output staging multiplexer 436.

Meanwhile, the register file unit 440D outputs the first read data (RD1) via its output 441D and sends RD1 to the read staging multiplexer 432. The read staging multiplexer 432 couples the RD1 to its output 434 that is coupled to the input 435A of the read staging register 435. Then, the RD1 from register file unit 440D is stored in the read staging register 435.

Figure 7A:
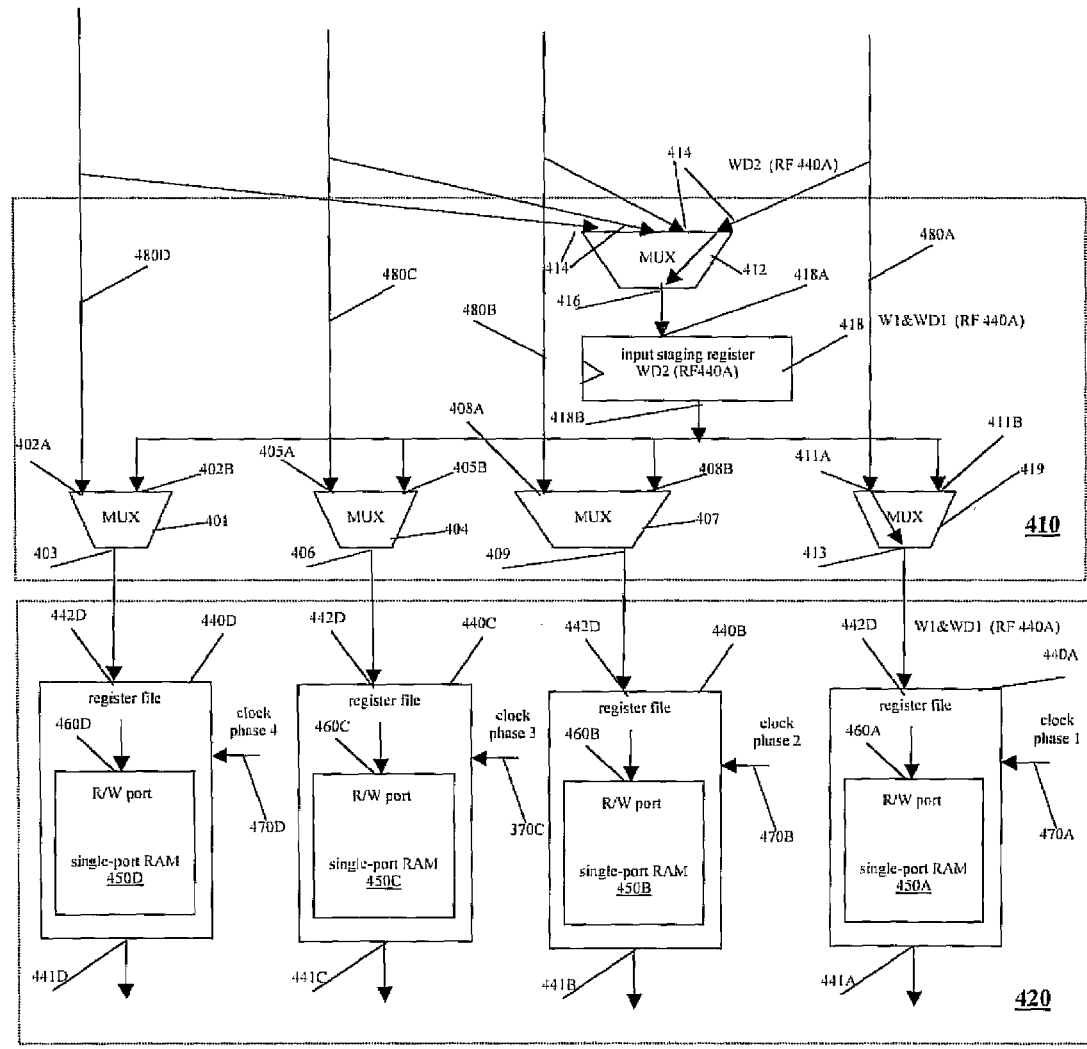
FIGS. 7A-7D illustrate operation of an input staging unit of FIG. 4B in accordance with an embodiment of the present invention.

FIGS. 7A-7D illustrate operation of the input staging unit 410 of FIG. 4B in accordance with an embodiment of the present invention. During 1st clock cycle as illustrated in FIG. 7A, the first write operation (W1) and the first write data (WD1) are received via line 480A that is coupled to the input 411A of input multiplexer 419. The input multiplexer 419 couples the W1 and the WD1 to its output 413. Then, the register file unit 440A receives the W1 and the WD1 at its input 442A.

Further, at least the second write data (WD2) for the second write operation (W2) is received via line 480A that is coupled to the input 414 of write staging multiplexer 412. The write staging multiplexer 412 couples the WD2 to its output 416 that is coupled to the input 418A of the write staging register 418. Then, the WD2 for register file unit 440A is stored in the write staging register 418.

Figure 7B:
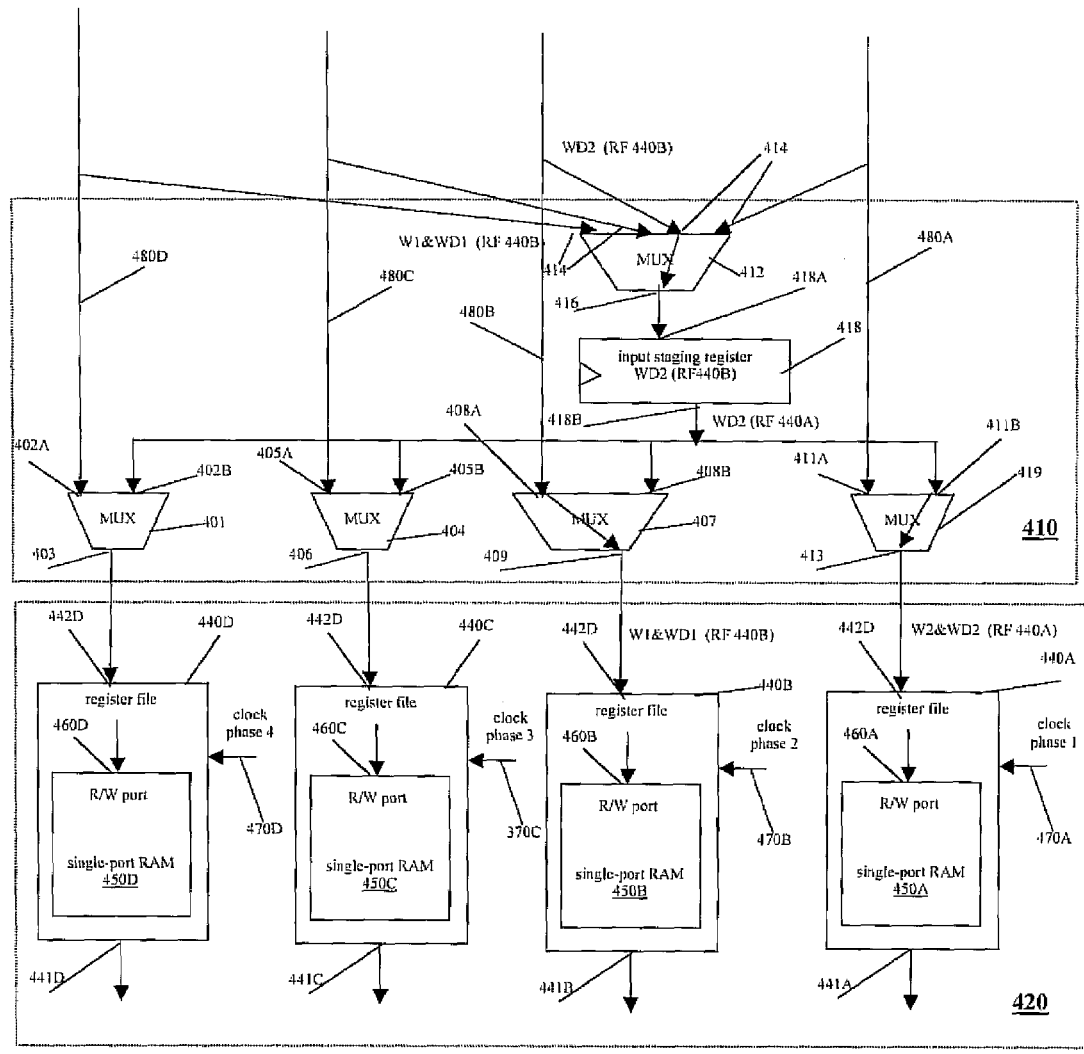

During 2nd clock cycle as illustrated in FIG. 7B, the write staging register 418 outputs the WD2 for the register file unit 440A via output 418B that is coupled to the input 411B of input multiplexer 419. Then, the register file unit 440A receives the second write operation W2 (via line 480A, output 418B, or from any other source) and the WD2 at its input 442A.

Continuing, the first write operation (W1) and the first write data (WD1) are received via line 480B that is coupled to the input 408A of input multiplexer 407. The input multiplexer 407 couples the W1 and the WD1 to its output 409. Then, the register file unit 440B receives the W1 and the WD1 at its input 442B.

Further, at least the second write data (WD2) for the second write operation (W2) is received via line 480B that is coupled to the input 414 of write staging multiplexer 412. The write staging multiplexer 412 couples the WD2 to its output 416 that is coupled to the input 418A of the write staging register 418. Then, the WD2 for register file unit 440B is stored in the write staging register 418.

Figure 7C:
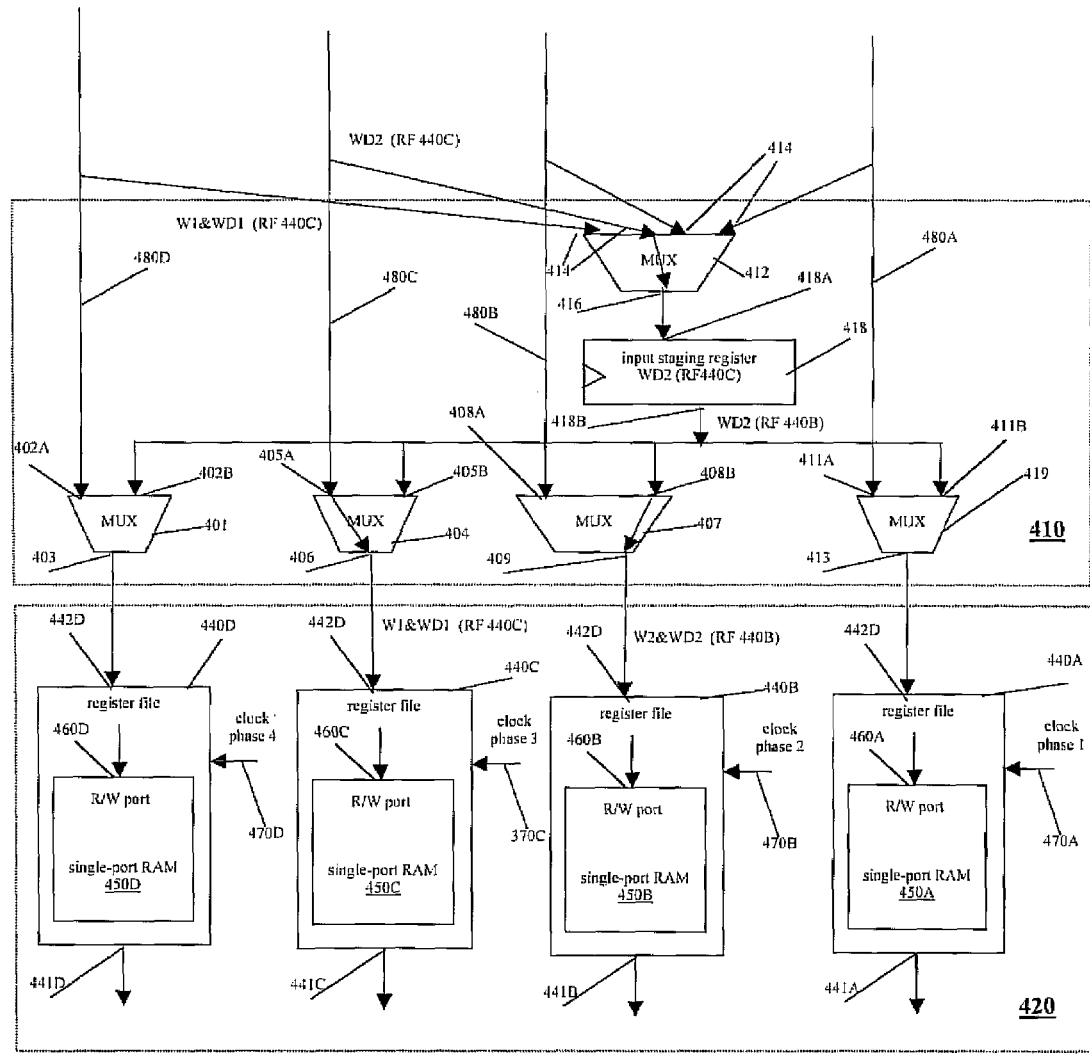

During 3rd clock cycle as illustrated in FIG. 7C, the write staging register 418 outputs the WD2 for the register file unit 440B via output 418B that is coupled to the input 408B of input multiplexer 407. Then, the register file unit 440B receives the second write operation W2 (via line 480B, output 418B, or from any other source) and the WD2 at its input 442B.

Continuing, the first write operation (W1) and the first write data (WD1) are received via line 480C that is coupled to the input 405A of input multiplexer 404. The input multiplexer 404 couples the W1 and the WD1 to its output 406. Then, the register file unit 440C receives the W1 and the WD1 at its input 442C.

Further, at least the second write data (WD2) for the second write operation (W2) is received via line 480C that is coupled to the input 414 of write staging multiplexer 412. The write staging multiplexer 412 couples the WD2 to its output 416 that is coupled to the input 418A of the write staging register 418. Then, the WD2 for register file unit 440C is stored in the write staging register 418.

Figure 7D:
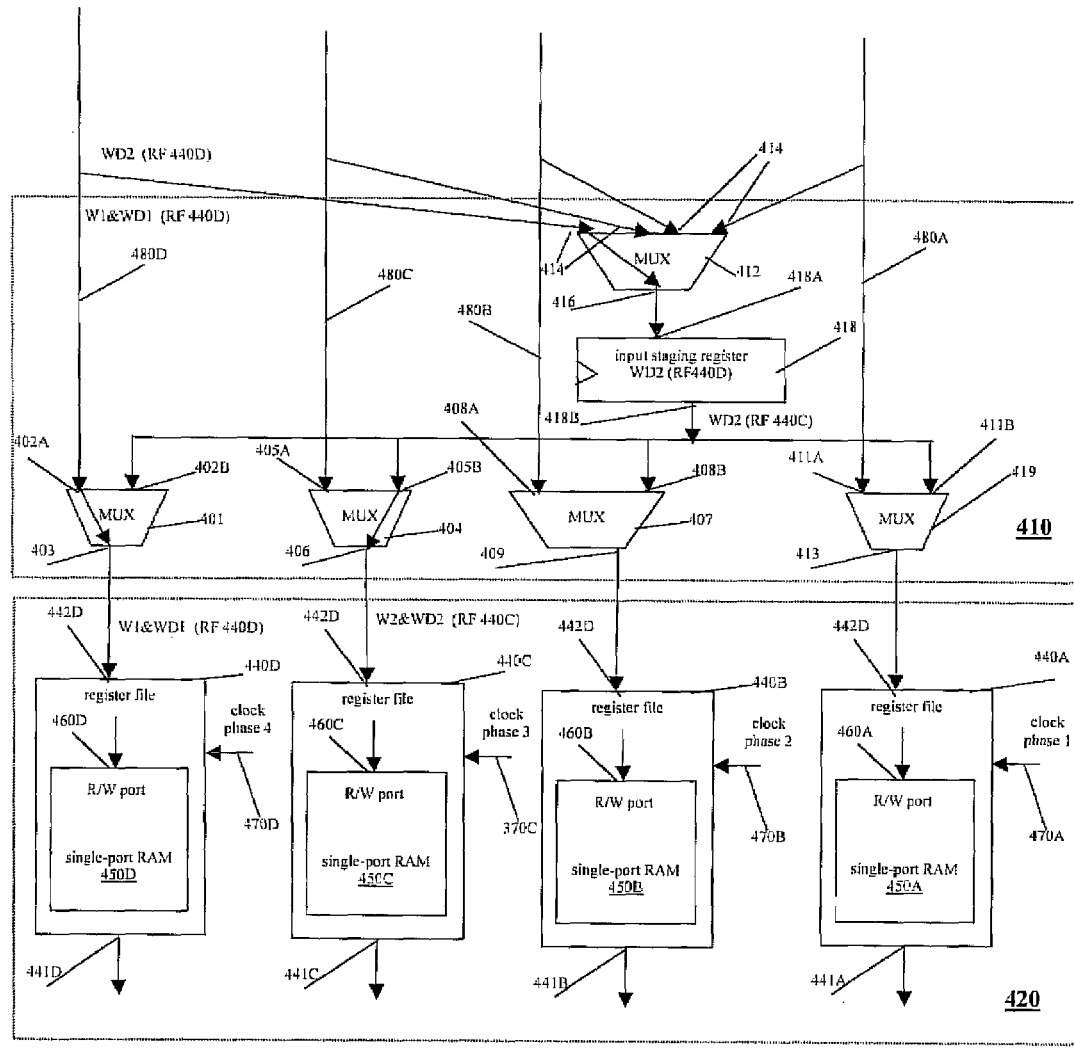

During 4th clock cycle as illustrated in FIG. 7D, the write staging register 418 outputs the WD2 for the register file unit 440C via output 418B that is coupled to the input 405B of input multiplexer 404. Then, the register file unit 440C receives the second write operation W2 (via line 480C, output 418B, or from any other source) and the WD2 at its input 442C.

Continuing, the first write operation (W1) and the first write data (WD1) are received via line 480D that is coupled to the input 402A of input multiplexer 401. The input multiplexer 401 couples the W1 and the WD1 to its output 403. Then, the register file unit 440D receives the W1 and the WD1 at its input 442D.

Further, at least the second write data (WD2) for the second write operation (W2) is received via line 480D that is coupled to the input 414 of write staging multiplexer 412. The write staging multiplexer 412 couples the WD2 to its output 416 that is coupled to the input 418A of the write staging register 418. Then, the WD2 for register file unit 440D is stored in the write staging register 418.

Figure 8:
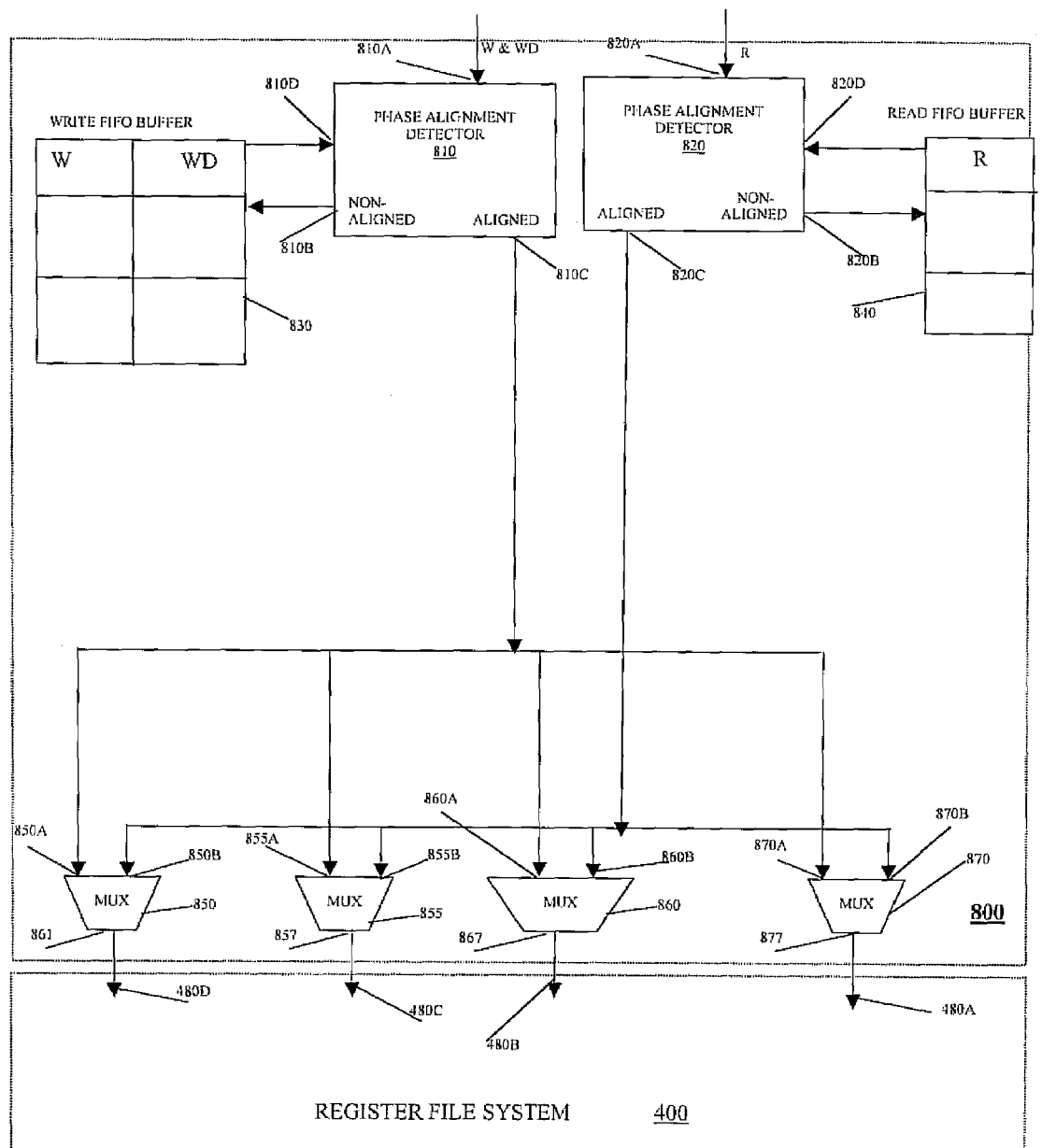
FIG. 8 illustrates a phase alignment unit for the register file system of FIG. 4B in accordance with an embodiment of the present invention.

FIG. 8 illustrates a phase alignment unit 800 for the register file system 400 of FIG. 4B in accordance with an embodiment of the present invention. The phase alignment unit 800 includes a first phase alignment detector 810, a second phase alignment detector 820, a write FIFO (First In First Out) buffer 830, a read FIFO (First In First Out) buffer 840, and a plurality of multiplexers 850, 855, 860 and 870. The multiplexer 850 has first and second inputs 850A and 850B and an output 861 coupled to line 480D that transmits operations to be performed by respective register file unit 440D. The multiplexer 855 has first and second inputs 855A and 855B and an output 857 coupled to line 480C that transmits operations to be performed by respective register file unit 440C. The multiplexer 860 has first and second inputs 860A and 860B and an output 867 coupled to line 480B that transmits operations to be performed by respective register file unit 440B. Also, the multiplexer 870 has first and second inputs 870A and 870B and an output 877 coupled to line 480A that transmits operations to be performed by respective register file unit 440A.

Received read operations (R) and write operations (W) may be out of phase due to anyone of several reasons, such as stalls or bubbles. As discussed above with respect to FIG. 2B, the clock phases 270A-270B generated from the clock 280 are shifted from one another by one clock cycle. Moreover, each clock phase 270A-270B has a read phase and a write phase. Continuing with the assumption that each register file unit performs two read operations and two write operations for a quad, the two read operations have to be received within the read phase to avoid getting out of phase. Similarly, the two write operations have to be received within the write phase to avoid getting out of phase.

The first phase alignment detector 810 determines whether the received write operations (W) and corresponding write data (WD) are out of phase or in phase. Further, the first phase alignment detector 810 determines whether the earliest received write operation (W) and write data (WD) stored in the write FIFO buffer 830 is out of phase or in phase. The first phase alignment detector 810 has a first input 810A for receiving the write operations (W) and write data (WD), a second input 810D for receiving the earliest received write operation (W) and write data (WD) stored in the write FIFO buffer 830. Moreover, the first phase alignment detector 810 has a first output 810B for outputting received write operations (W) and corresponding write data (WD) that are out of phase. The first output 810B is coupled to the write FIFO buffer 830. Also, the first phase alignment detector 810 has a second output 810C for outputting received write operations (W) and corresponding write data (WD) that are in phase and for outputting the earliest received write operation (W) and write data (WD) stored in the write FIFO buffer 830 that is in phase. The second output 810C is coupled to the inputs 850A, 855A, 860A, and 870A of multiplexers 850, 855, 860 and 870, respectively.

The write FIFO buffer 830 stores write operations (W) and corresponding write data (WD) received out of phase. Further, the write FIFO buffer 830 utilizes the first phase alignment detector 810 to provide each stored write operation (W) and corresponding write data (WD) to a respective line 480A-480D in phase, wherein each line 480A-480D transmits operations to be performed by a respective register file unit 440A-440D. Since there are four clock phases, the write FIFO buffer 830 should be capable of storing at least three write operations (W) and corresponding write data (WD). An idle clock cycle can serve to reduce the number of write operations (W) and corresponding write data (WD) stored in the write FIFO buffer 830.

The second phase alignment detector 820 determines whether the received read operations (R) are out of phase or in phase. Further, the second phase alignment detector 820 determines whether the earliest received read operation (R) stored in the read FIFO buffer 840 is out of phase or in phase. The second phase alignment detector 820 has a first input 820A for receiving the read operations (R) and a second input 820D for receiving the earliest received read operation (R) stored in the read FIFO buffer 840. Moreover, the second phase alignment detector 820 has a first output 820B for outputting received read operations (R) that are out of phase. The first output 820B is coupled to the read FIFO buffer 840. Also, the second phase alignment detector 820 has a second output 820C for outputting received read operations (R) that are in phase and for outputting the earliest received read operation (R) stored in the read FIFO buffer 840 that is in phase. The second output 820C is coupled to the inputs 850B, 855B, 860B, and 870B of multiplexers 850, 855, 860 and 870, respectively.

The read FIFO buffer 840 stores read operations (R) received out of phase. Further, the read FIFO buffer 840 utilizes the second phase alignment detector 820 to provide each stored read operation (R) to a respective line 480A-480D in phase, wherein each line 480A-480D transmits operations to be performed by a respective register file unit 440A-440D. Since there are four clock phases, the read FIFO buffer 840 should be capable of storing at least three read operations (R). An idle clock cycle can serve to reduce the number of read operations (R) stored in the read FIFO buffer 840.

If stalls or bubbles do not occur or are not allowed, the register file system 400 will not be out of phase. Thus, the read and write FIFO buffers 830 and 840 and the phase alignment detectors 810 and 820 may be omitted to conserve semiconductor area.

FIG. 9 illustrates a flow chart showing a method 900 of operating a plurality of register file units in accordance with an embodiment of the present invention.

At Step 910, a plurality of clock phases are generated from a clock. Further, at Step 920, one of the clock phases is assigned to each register file unit. Each register file unit comprises a single-port RAM comprising a single port for read operations and for write operations associated with one of a plurality of data groups (e.g., quads).

Continuing, at Step 930, a memory operation (e.g., read operation or write operation) associated with one of the data groups (e.g., quads) is received. At Step 940, it is determined whether the memory operation is in phase. If the memory operation is in phase, the method proceeds to Step 950. At Step 950, the memory operation is sent to the appropriate register file unit for performance of the memory operation. Further, at Step 955, each register file unit serially performs the sent memory operations using its single-port RAM and the assigned clock phase. Then, the method proceeds to Step 930 again.

Otherwise, at Step 960, the memory operation is sent to the appropriate (read or write) FIFO buffer to store the operation. At Step 970, it is determined whether the earliest received memory operation (read or write) stored in the appropriate (read or write) FIFO buffer is in phase. If the earliest received memory operation (read or write) stored in the appropriate (read or write) FIFO buffer is in phase, the method proceeds to Step 950. Otherwise, the method proceeds to Step 930 again.

This operation of the register file units conserves use of semiconductor area on a semiconductor device. In an embodiment, the semiconductor device is a GPU.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A semiconductor device comprising:
    a plurality of register files, each register file comprising a random access memory (RAM) comprising a single port for read operations and for write operations, wherein for at least one of a plurality of data groups each RAM serially performs N read operations and M write operations in a single clock cycle of a single assigned clock phase of (N+M) clock phases generated from a clock, wherein each of said (N+M) clock phases is shifted from each other by at least one clock cycle of said clock, and wherein said clock cycle of each assigned clock phase includes (N+M) clock cycles of said clock;
    an input staging unit for staging write data of one or more of said write operations, wherein said input staging unit is coupled to said plurality of register files and comprises a configuration dependent on value of M; and
    an output staging unit for staging read data of one or more of said read operations, wherein said output staging unit is coupled to said plurality of register files and comprises a configuration dependent on value of N.

2. The semiconductor device as recited in claim 1 wherein said plurality of register files is Z register files, and wherein Z is equal to (N+M).

3. The semiconductor device as recited in claim 1 wherein N is two and M is two, and wherein said assigned clock phase is one of four clock phases generated from said clock.

4. The semiconductor device as recited in claim 3 wherein said input staging unit comprises:
    a write staging multiplexer comprising an output and a plurality of inputs, each input coupled to one of a plurality of lines, each line transmitting operations to be performed by one of said register files, wherein one of said inputs is selectively coupled to said output;
    a write staging register comprising an output and an input coupled to said output of said write staging multiplexer, wherein said write staging register stores second write data for a second write operation to be performed in a next clock cycle while first write data is utilized in a first write operation performed in a current clock cycle; and
    a plurality of input multiplexers, each input multiplexer comprising an output coupled to one of said register files, wherein each input multiplexer further comprises a first input coupled to one of said line and a second input coupled to said output of said write staging register, and wherein one of said inputs is selectively coupled to said output of each input multiplexer.

5. The semiconductor device as recited in claim 3 wherein said output staging unit comprises:
    a read staging multiplexer comprising an output and a plurality of inputs, each input coupled to an output of one of said register files, each output of said register files outputting read data, wherein one of said inputs of said read staging multiplexer is selectively coupled to said output of said read staging multiplexer;
    a read staging register comprising an output and an input coupled to said output of said read staging multiplexer, wherein said read staging register stores first read data from first read operation performed in a current clock cycle while second read data is available from second read operation performed in a next clock cycle; and
    an output multiplexer comprising an output and a plurality of inputs, each input coupled to said output of one of said register files, wherein one of said inputs is selectively coupled to said output of said output multiplexer, and wherein said read staging register outputs said first read data in said next clock cycle.

6. The semiconductor device as recited in claim 1 further comprising a read FIFO (first in first out) buffer for storing read operations received out of phase, wherein said read FIFO buffer provides each stored read operation to one of a plurality of lines in phase, each line transmitting operations to be performed by one of said register files.

7. The semiconductor device as recited in claim 1 further comprising a write FIFO (first in first out) buffer for storing write operations and corresponding write data received out of phase, wherein said write FIFO buffer provides each stored write operation and corresponding write data to one of a plurality of lines in phase, each line transmitting operations to be performed by one of said register files.

8. The semiconductor device as recited in claim 1 further comprising a graphics shader.

9. The semiconductor device as recited in claim 8 wherein said graphics shader requests said read operations and said write operations.

10. The semiconductor device as recited in claim 9 wherein each data group comprises a plurality of fragments processed by said graphics shader.

11. The semiconductor device as recited in claim 10 wherein N is two and M is two, wherein Z is number of register files, wherein Z is equal to (N+M), and wherein (Z−3)th register file, (Z−2)th register file, (Z−1)th) register file, and (Z)th register file receive read operations and write operations associated with [(k*Z)−3th] plurality of fragments, [(k*Z)−2th] plurality of fragments, [(k*Z)−1th] plurality of fragments, and [(k*Z)th] plurality of fragments, respectively, such that k is an integer greater than zero.

12. The semiconductor device as recited in claim 1 wherein said semiconductor device comprises a graphics processing unit (GPU).

13. A method of operating a plurality of register files, said method comprising:
    generating a plurality of clock phases from a clock, wherein each of said clock phases is shifted from each other by at least one clock cycle of said clock;
    assigning a single clock phase to each register file, wherein each register file comprises a random access memory (RAM) comprising a single port for read operations and for write operations associated with one of a plurality of data groups;
    assigning a sequential order designation to each data group, wherein said sequential order designation determines a corresponding register file for handling memory operations associated with data group corresponding to said sequential order designation;
    receiving one or more memory operations associated with said data groups, wherein each memory operation is one of a read operation and a write operation;

sending each memory operation to said corresponding register file based on said sequential order designation of said data group associated with said memory operation; and serially performing a fixed number of said sent memory operations in each register file in a single clock cycle of said assigned clock phase using said RAM, wherein said clock cycle of each assigned clock phase includes said fixed number of clock cycles of said clock.

14. The method as recited in claim 13 further comprising:
staging write data of one or more of said memory operations before input of said register files; and
staging read data of one or more of said memory operations after output of said register files.

15. The method as recited in claim 14 wherein said serially performing comprises:
serially performing two read operations and two write operations for each data group in said single clock cycle of said assigned clock phase.

16. The method as recited in claim 15 wherein said staging write data utilizes an input staging unit comprising:
a write staging multiplexer comprising an output and a plurality of inputs, each input coupled to one of a plurality of lines, each line transmitting operations to be performed by one of said register files, wherein one of said inputs is selectively coupled to said output;
a write staging register comprising an output and an input coupled to said output of said write staging multiplexer, wherein said write staging register stores second write data for a second write operation to be performed in a next clock cycle while first write data is utilized in a first write operation performed in a current clock cycle; and
a plurality of input multiplexers, each input multiplexer comprising an output coupled to one of said register files, wherein each input multiplexer further includes a first input coupled to one of said line and a second input coupled to said output of said write staging register, and wherein one of said inputs is selectively coupled to said output of each input multiplexer.

17. The method as recited in claim 15 wherein said staging read data utilizes an output staging unit comprising:
a read staging multiplexer comprising an output and a plurality of inputs, each input coupled to an output of one of said register files, each output of said register files outputting read data, wherein one of said inputs of said read staging multiplexer is selectively coupled to said output of said read staging multiplexer;
a read staging register comprising an output and an input coupled to said output of said read staging multiplexer, wherein said read staging register stores first read data from first read operation performed in a current clock cycle while second read data is available from second read operation performed in a next clock cycle; and
an output multiplexer comprising an output and a plurality of inputs, each input coupled to said output of one of said register files, wherein one of said inputs is selectively coupled to said output of said output multiplexer, and wherein said read staging register outputs said first read data in said next clock cycle.

18. The method as recited in claim 13 further comprising:
storing memory operations that are read operations received out of phase in a read FIFO (first in first out) buffer, wherein said read FIFO buffer provides each stored read operation to one of a plurality of lines in phase, each line transmitting operations to be performed by one of said register files.

19. The method as recited in claim 13 further comprising:
storing memory operations that are write operations and corresponding write data received out of phase in a write FIFO (first in first out) buffer, wherein said write FIFO buffer provides each stored write operation and corresponding write data to one of a plurality of lines in phase, each line transmitting operations to be performed by one of said register files.

20. The method as recited in claim 13 further comprising:
performing operations on a graphics shader.

21. The method as recited in claim 20 wherein said graphics shader requests said memory operations.

22. The method as recited in claim 21 wherein each data group comprises a plurality of fragments processed by said graphics shader.

23. The method as recited in claim 22 wherein said memory operations comprise two read operations and two write operations for each data group, wherein Z is number of register files, wherein Z is equal to 4, and wherein (Z−3)th register file, (Z−2)th register file, (Z−1)th register file, and (Z)th register file receive memory operations associated with [(k*Z)−3th] plurality of fragments, [(k*Z)−2th] plurality of fragments, [(k*Z)−1th] plurality of fragments, and [(k*Z)th] plurality of fragments, respectively, such that k is an integer greater than zero.

* * * * *